No. 862,127. PATENTED AUG. 6, 1907.
C. B. AUEL.
CENTRIFUGAL SWITCHING DEVICE.
APPLICATION FILED DEC. 3, 1906.

WITNESSES:
Fred H. Miller
R. J. Dearborn

INVENTOR
Carl B. Auel
BY
Wesley G. Carr
ATTORNEY

UNITED STATES PATENT OFFICE.

CARL B. AUEL, OF WILKINSBURG, PENNSYLVANIA, ASSIGNOR TO WESTINGHOUSE ELECTRIC & MANUFACTURING COMPANY, A CORPORATION OF PENNSYLVANIA.

CENTRIFUGAL SWITCHING DEVICE.

No. 862,127.　　　　Specification of Letters Patent.　　　　Patented Aug. 6, 1907.

Application filed December 3, 1906. Serial No. 346,084.

*To all whom it may concern:*

Be it known that I, CARL B. AUEL, a citizen of the United States, and a resident of Wilkinsburg, in the county of Allegheny and State of Pennsylvania, have invented a new and useful Improvement in Centrifugal Switching Devices, of which the following is a specification.

My invention relates to centrifugal switching devices, and has special reference to means for limiting the speed of dynamo-electric machines which are supplied with electric energy.

Direct current motors and rotary converters are liable to run away or to operate at dangerously high speeds if their fields are weakened and consequently it is desirable to provide means for automatically interrupting the circuits from which they receive their energy in case their rotating parts exceed predetermined speeds. Centrifugally operated switches that have usually been employed for this purpose in the prior art, comprise stationary contact rings, which are insulated from each other and to which an interrupted release magnet circuit is connected, and bridging contact members which are carried by the rotating shaft of the machine and are adapted to complete a circuit through the stationary rings when the speed of the rotating parts exceeds a predetermined value. A circuit-breaker is adapted to interrupt the supply circuit in a well known manner when the release magnet circuit is completed. Some trouble has heretofore been experienced in the operation of these devices on account of the shape and arrangement of the bridging contact members which often failed to simultaneously engage both of the stationary contact rings.

According to my present invention, I employ centrifugally operated bridging contact members which are reliable in operation and of improved construction and adapted to effect a good electrical connection between the stationary rings.

Figure 1:
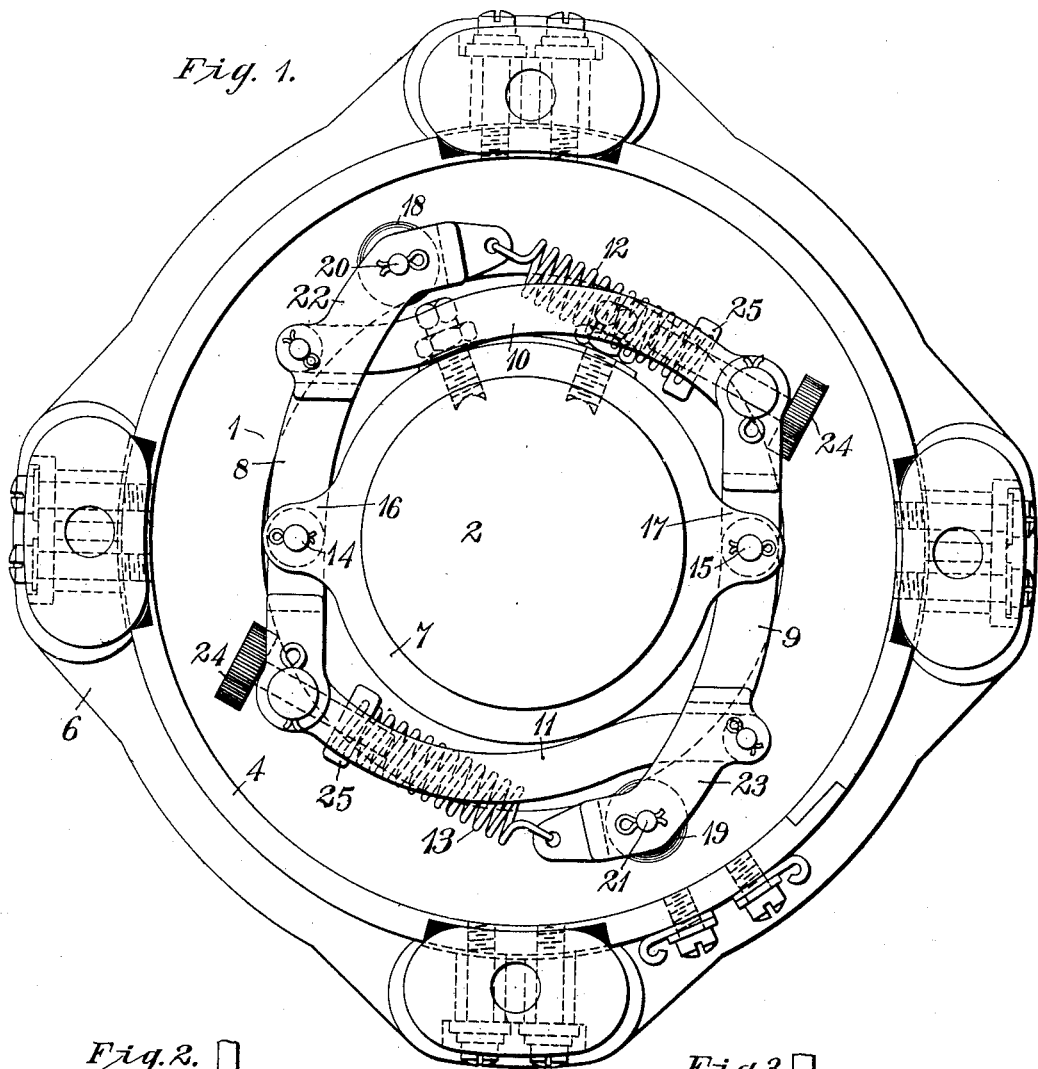
Figure 2:
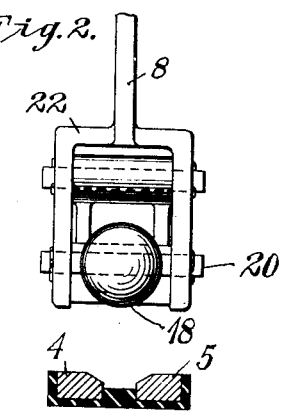

Figure 1 of the accompanying drawings is an end elevation of a rotatable shaft equipped with the centrifugal switching device of my invention. Fig. 2 is a partial sectional elevation of the device shown in Fig. 1, and Fig. 3 is a view similar to Fig. 2 of a modified form of a contact device.

Referring to Figs. 1 and 2 of the drawings, a centrifugal switching device 1 is attached to a shaft 2 which may be rotatably mounted in any suitable form of stationary bearings (not shown). A pair of similar contact rings 4 and 5 are supported in parallel planes by a stationary bracket 6 that may be attached to the end of the shaft bearing or supported by other means. The centrifugal switching device 1 comprises a ring or collar 7 that is fitted on and attached to the end of the shaft 2, contact-bearing levers 8 and 9, interconnecting links 10 and 11 and springs 12 and 13. The contact-bearing members 8 and 9 are respectively pivotally mounted, at short distances from corresponding ends, on pin shafts 14 and 15 which are supported by diametrically opposite ears 16 and 17 upon the ring 7. Spherical contact members 18 and 19 are loosely mounted on pin shafts 20 and 21 which are supported by bifurcated end portions 22 and 23 of the levers 8 and 9. The link 10 connects the free end of the lever 9 to a point in the other lever between its pin shaft 14 and its contact member, and the link 11 connects the free end of lever 8 to a point in the lever 9 between its pin shaft 15 and its contact member. The arrangement of parts is such that when the centrifugal switching device is rotated at a speed which exceeds a predetermined value, the contact members 18 and 19 will move outwardly until they make contact with the rings 4 and 5. The speed value at which this action is permitted is determined by the springs 12 and 13 which connect the opposite ends of the levers 8 and 9 together, and the tension of which may be adjusted by screw-threaded bolts 24 that engage nuts 25 to which the ends of the springs are attached. The inner surfaces of the rings 4 and 5 are beveled or otherwise formed to so guide the spherical contact members 18 and 19, which are loosely mounted on their shafts, as to insure engagement with both rings and thereby establish an excellent electrical connection between them.

I deem it unnecessary to illustrate circuit connections for effecting the interruption of the circuit which supplies energy for the operation of the rotating member to which the centrifugal switch is attached, since devices of this character are well known in the art.

Figure 3:
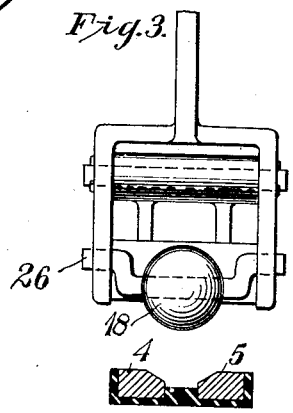

In order that the spherical contact members 18 and 19 may have a greater freedom of motion, the arrangement shown in Fig. 3 may be employed, if desired. Referring to this figure, shafts 26 upon which the spherical contact members are mounted, are of crank form so that a greater radial motion of the contact device is permitted.

I desire that only such limitations be imposed as are indicated in the appended claims.

I claim as my invention:

1. The combination with stationary contact rings, of centrifugally operated substantially spherical bridging contact members that coöperate with said contact rings.

2. The combination with a rotatable shaft and stationary contact rings, of centrifugally operated spherical bridging contact members which coöperate with said rings and are attached to the rotatable shaft.

3. The combination with a pair of stationary contact rings having inclined contact surfaces, of a centrifugally operated bridging contact member which coöperates therewith and comprises an adjustably mounted spherical contact member of conducting material.

4. The combination with a rotatable member and an arm pivotally attached thereto, of a contact ball adjustably mounted on the outer end of the arm, and stationary engaging contact rings which may be electrically connected by the contact ball when the speed of the rotating member exceeds a predetermined value.

5. The combination with stationary and rotating members, of a speed limiting device comprising a pair of stationary ring contact members, and a centrifugally operated arm that is pivotally attached to the rotating member and is provided with a spherical contact member to engage said ring contact members.

6. The combination with a rotatable shaft, and similar contact rings insulated from each other and so located in parallel planes that their centers fall in the center line of the shaft, of a collar attached to the shaft and having projecting ears, switch levers pivotally attached to the ears, and spherical contact members rotatably mounted at the outer extremities of the levers, said contact members being adapted to make electrical contact between the rings when the speed of the shaft exceeds a predetermined limit.

In testimony whereof, I have hereunto subscribed my name this 28th day of November, 1906.

CARL B. AUEL.

Witnesses:
H. A. TAYLOR,
BIRNEY HINES.